United States Patent [19]

Daniels

[11] Patent Number: 4,638,439
[45] Date of Patent: Jan. 20, 1987

[54] POSTAGE METERING SYSTEM WITH DISPLAY

[75] Inventor: Edward P. Daniels, Bridgeport, Conn.

[73] Assignee: Pitney Bowes Inc., Stamford, Conn.

[21] Appl. No.: 491,843

[22] Filed: May 5, 1983

[51] Int. Cl.$^4$ .................. G07B 17/02; G06F 15/20
[52] U.S. Cl. ........................................ 364/446; 177/25
[58] Field of Search .................. 364/466, 464; 177/25; 340/334, 336, 337

[56] References Cited

U.S. PATENT DOCUMENTS

| | | | |
|---|---|---|---|
| 3,635,297 | 1/1972 | Salava | 364/466 X |
| 4,055,753 | 10/1977 | Rogers et al. | 364/466 |
| 4,139,892 | 2/1979 | Gudea et al. | 364/466 X |
| 4,366,552 | 12/1982 | Uchimura et al. | 364/466 X |
| 4,398,253 | 9/1983 | Karp et al. | 364/466 |
| 4,420,819 | 12/1983 | Price et al. | 364/466 X |
| 4,423,486 | 12/1983 | Berner | 364/466 |
| 4,447,885 | 5/1984 | Biss | 177/25 X |
| 4,462,473 | 7/1984 | Valestin | 364/466 X |
| 4,481,604 | 11/1984 | Gilham et al. | 364/464 X |
| 4,495,581 | 1/1985 | Piccione | 364/466 |

FOREIGN PATENT DOCUMENTS

2063162 10/1979 United Kingdom .
2047058 11/1980 United Kingdom .
2090508 7/1982 United Kingdom .

Primary Examiner—Edward J. Wise
Attorney, Agent, or Firm—Robert H. Whisker; Melvin J. Scolnick; David E. Pitchenik

[57] ABSTRACT

A postage value determining scale includes a scale for determining the weight of an item to be mailed, a system processor for determining the applicable postage value and a display for displaying a breakdown of such postage value, all inter-connected by a common data bus. Another embodiment of the disclosed invention further includes a keyboard having a keyset limited to numeric keys and function keys for entering additional information such as class of service, destination, etc. into the system processor to be used by the system processor in determining the applicable postage value; the system processor transmitting such information to the display. Preferably, the display includes a display processor, a display device operatively connected to the display processor for displaying alphanumeric information and a memory operatively connected to the display processor. The memory stores data defining display routines and formats and alphanumeric data codes corresponding to the various components of the postage values. The display processor uses these codes to display the components of the determined postage value in a predetermined format in alphanumeric form.

6 Claims, 10 Drawing Figures

```
WEIGHT:          lbs         ozs
CLASS:
DESTINATION:
BASE FEE:
SPECIAL FEES:

TOTAL:
```

FIG. 4

```
WEIGHT:       13 lbs    15.5 ozs
CLASS:
DESTINATION:
BASE FEE:
SPECIAL FEES:

TOTAL:
```

FIG. 5

```
WEIGHT:       13 lbs    15.5 ozs
CLASS:  INTERNATIONAL AIR
DESTINATION:
BASE FEE:
SPECIAL FEES:

TOTAL:
```

FIG. 6

```
WEIGHT:     13 lbs    15.5 ozs
CLASS: INTERNATIONAL AIR
DESTINATION: AFGANISTAN
BASE FEE:              $ 89.00
SPECIAL FEES:

TOTAL:                 $ 89.00
```

FIG. 7

```
WEIGHT:     13 lbs    15.5 ozs
CLASS: INTERNATIONAL AIR
DESTINATION: ZAIRE
BASE FEE:              $ 88.00
SPECIAL FEES:

TOTAL:                 $ 88.00
```

FIG. 7a

```
WEIGHT:     13 lbs    15.5 ozs
CLASS: INTENATIONAL AIR
DESTINATION: AFGANISTAN
BASE FEE:              $ 89.00
SPECIAL FEES:
   CERTIFIED:          $  4.75
   (INSURANCE?)

TOTAL:                 $ 93.75
```

FIG. 8

```
WEIGHT:      13 lbs    15.5 ozs
CLASS: INTERNATIONAL AIR
DESTINATION: AFGANISTAN
BASE FEE:              $ 89.00
SPECIAL FEES:
   CERTIFIED:          $  4.75
   INSURED FOR $10,000. $ 70.52

TOTAL:                 $164.27
```

FIG. 9

POSTAGE METERING SYSTEM WITH DISPLAY

BACKGROUND OF THE INVENTION

Automatic postage metering systems are known. Such systems comprise a scale for determining the weight of an item to be mailed, a system processor for determining the applicable postage value in accordance with that weight and a postage meter operatively associated with the processor which is set with the applicable postage value and prints corresponding indicia on the item to be mailed. In more sophisticated applications, the operator of such a system may have a keyboard to enter other information to be used in determining the applicable postage value into the system. Thus, the operator may enter information relating to destination, class of service and/or special fees into the system and the system processor will determine the applicable postage value in accordance with the entered information and the weight of the item to be mailed.

Such a system is disclosed in U.S. Pat. No. 4,286,325 to Dlugos et al. entitled SYSTEM AND METHOD FOR COMPUTING DOMESTIC AND INTERNATIONAL POSTAGE which issued Aug. 25, 1981. The system disclosed in this patent is capable of determining and imprinting postage values for domestic and foreign mail, both surface and air, as well as private carrier rates. A similar system is disclosed in U.S. Pat. No. 4,325,440 to Crowley et al. entitled METHOD AND SYSTEM FOR COMPUTING SPECIAL FEES IN A PARCEL POSTAGE METERING SYSTEM which issued Apr. 20, 1982. This system is structurally similar to that disclosed in the Dlugos et al. patent and provides the further ability to include special fees, such as C.O.D., return receipt, etc., in the computed postage value.

These patents represent what applicants believe to be the closest prior art to the subject invention and are hereby incorporated into the present application by reference.

While systems such as those taught in the incorporated patents have proven highly effective and advantageous in environments such as the mailing rooms of large corporations, where large volumes of commercial mail are processed for a single mailer, they would not be suitable for application as "Postal Window Systems". "Postal Window Systems" are postage metering systems that would be installed in post offices and individual mailers would bring one, or a few items, to be mailed and they, or an operator, would use the "Postal Window System" to determine the applicable postage value and imprint the corresponding indicia on the item to be mailed. Brief consideration of the incorporated patents will show that they are unsuitable for such "Postal Window" applications. In particular, this is because the prior art postage metering systems determined an applicable postage value as a single valued function of all information entered into the system. The postage value determined was an aggregate of all the information entered and no itemized breakdown of postage costs was provided, except that certain prior art postage mailing systems briefly displayed only the dollar value of components of the aggregate postage value. A typical such system is described in the copending patent application by the present inventor, *Postage Value Determining Scale with Recall and Display of Special Fees*, Ser. No. 363,179, filed Mar. 29, 1982. While such aggregate postage values might be acceptable in corporate mailing rooms where experienced operators handle large volumes of items to be mailed for a single corporate mailer and a certain small percentage of errors may be tolerated, they would not be acceptable to individual mailers mailing a small number of items. Thus, while a corporate mailer might tolerate one package in a thousand which was mailed with a wrong special fee, an individual mailer of single items would likely not tolerate an error where, for example, the one item he or she mailed was not mailed special delivery when that was intended. Yet, seeing only an aggregate postage value, they would have no chance to recognize the error, except for the possibility that the erroneous postage value might be recognized as too low. And, of course, the possibility of such errors would greatly increase with systems where the inexperienced individual mailer would act as his or her own operator.

Moreover, because postage metering systems are, in effect, machines for spending money the need for reliability and security is very great. Thus, it is important that in the development of new postage metering systems, such as "Postal Window Systems", tested hardware and software should be used to the greatest extent possible with the fewest modifications possible.

Thus, it is an object of the subject invention to provide a postage metering system which displays an itemized breakdown of the determined postage value.

It is a further object of the subject invention to provide a postage metering system wherein such a display is provided by a readily separable subsystem which is not closely coupled to the system processor.

It is a still further object of the subject invention to provide a postage metering system which is suitable for use as a "Postal Window System" where numerous individuals mail small numbers of items and it is highly important that each item be mailed correctly.

BRIEF SUMMARY OF THE INVENTION

The above objects are achieved and the disadvantages of the prior art are overcome by means of the subject invention which comprises a postage metering system having a display for displaying components of a determined postage value. In a preferred embodiment, the postage metering system of the subject invention comprises a scale for determining the weight of an item to be mailed, a system processor for determining the applicable postage value in accordance with the weight of such item, a data bus for interconnecting these units and an additional subsystem comprising the display of the subject invention operatively connected to the bus. A more preferred embodiment of the subject invention further comprises a keyboard having a keyset limited to numeric keys and function keys for entering additional information, such as class of service, destination, etc., into the system processor to be used by the system processor in determining the applicable postage value and the system processor transmits such information to the display subsystem for display. And, in a still yet more preferred embodiment of the subject invention, the display subsystem comprises a display processor, a display device operatively connected to the display processor for displaying alphanumeric information and a memory operatively connected to the display processor. The memory stores data defining display routines and formats and alphanumeric data codes corresponding to the various components of the postage values. The display processor uses these codes to display the components of the determined postage value in a predetermined format and in alpanumeric form.

Thus, it may be seen that the subject invention provides an advantageous postage metering system which is suitable for use as a "Postal Window System".

The system of the subject invention is particularly advantageous in that it provides for the display of components of the determined postage value in a readily understandable alphanumeric format without the need for extensive reprogramming of the system processor so that confidence in the validity of the postage value determining routines may be maintained.

Other objects and advantages of the subject invention will be apparent to those skilled in the art from consideration of the attached drawings depicting, and the detailed description of, a preferred embodiment of the subject invention.

DETAILED DESCRIPTION OF PREFERRED EMBODIMENTS OF THE SUBJECT INVENTION

Figure 1:
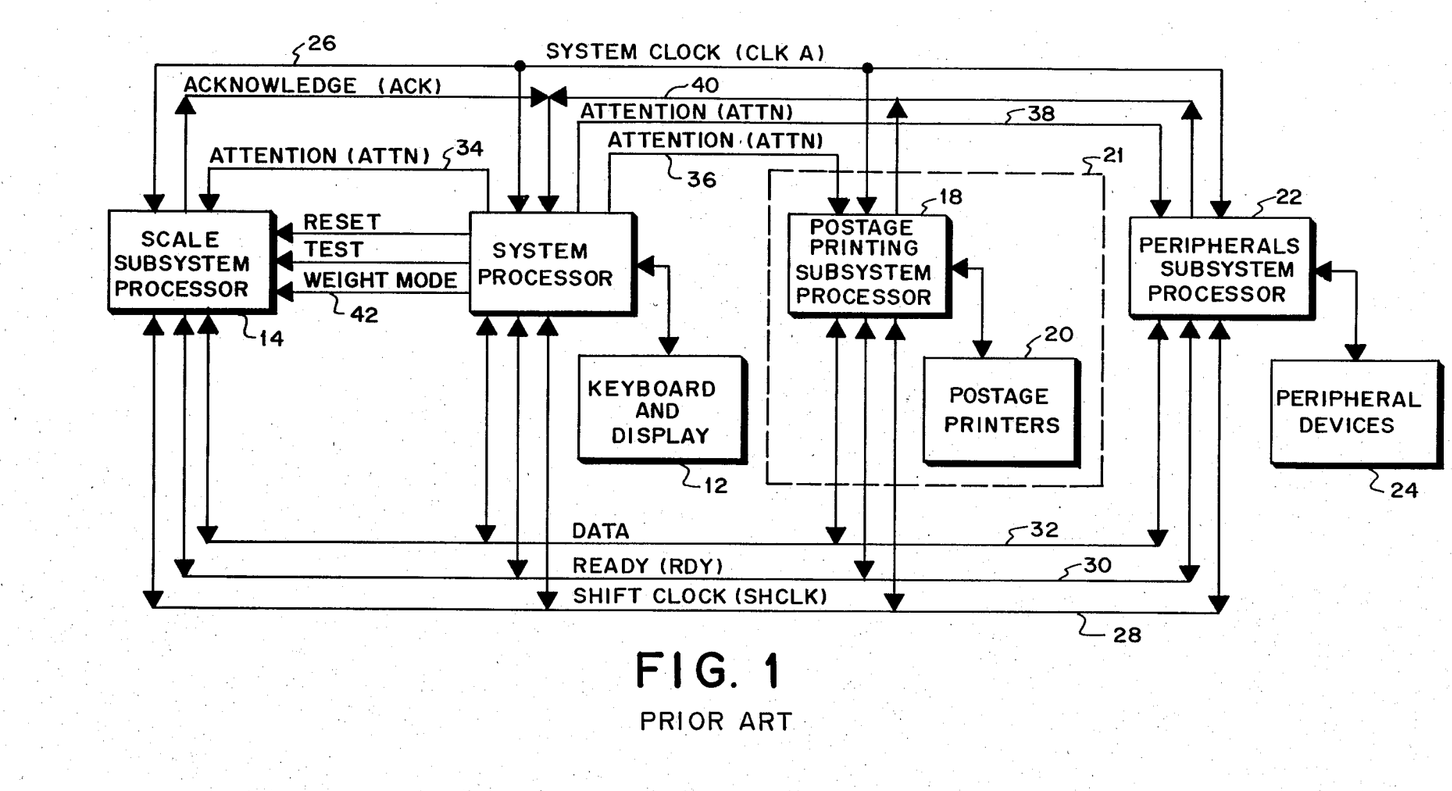
FIG. 1 is a schematic block diagram of a prior art postage metering system.

FIG. 1 shows a schematic block diagram of a prior art postage metering system. This system comprises a scale (not shown) and scale subsystem processor 14 which together comprise a scale means for determining the weight of items to be mailed, a system processor 10 for determining the applicable postage value for such an item in accordance with the weight of such item and other information provided by an operator through keyboard 12, a postage meter 21 for imprinting such items with indicia corresponding to the determined postage value and a peripheral systems processor 22 which controls various peripheral devices 24. Such peripherals might include, for example, a parcel identification number printer, a journal printer for printing accounts of transactions or an electronic accounting system.

The above-described subsystems are interconnected by a data communications bus comprising a number of common, bidirectional lines including clock lines 26 and 28, ready line 30, serial data line 32 and acknowledge line 40 and a second number of dedicated attention lines 34, 35 and 38 connecting system processor 10 with each of the other subsystems. Acknowledge lines 34, 36 and 38 are controlled by system processor 10 and are used to establish communications between system processor 10 and other subsystems.

A more complete understanding of the operation of such a postage metering system, and particularly the determination of the base postage fees and special fees which are the components of the determined postage value, may be obtained by reference to the the above-incorporated U.S. patents and a detailed description of the operation of the data communications bus may be found in U.S. Pat. No. 4,308,579, to Dlugos, entitled MULTIPROCESSOR PARCEL POSTAGE METERING SYSTEM HAVING SERIAL DATA BUS, which issued Dec. 29, 1981 and which is hereby incorporated by reference.

Figure 2:
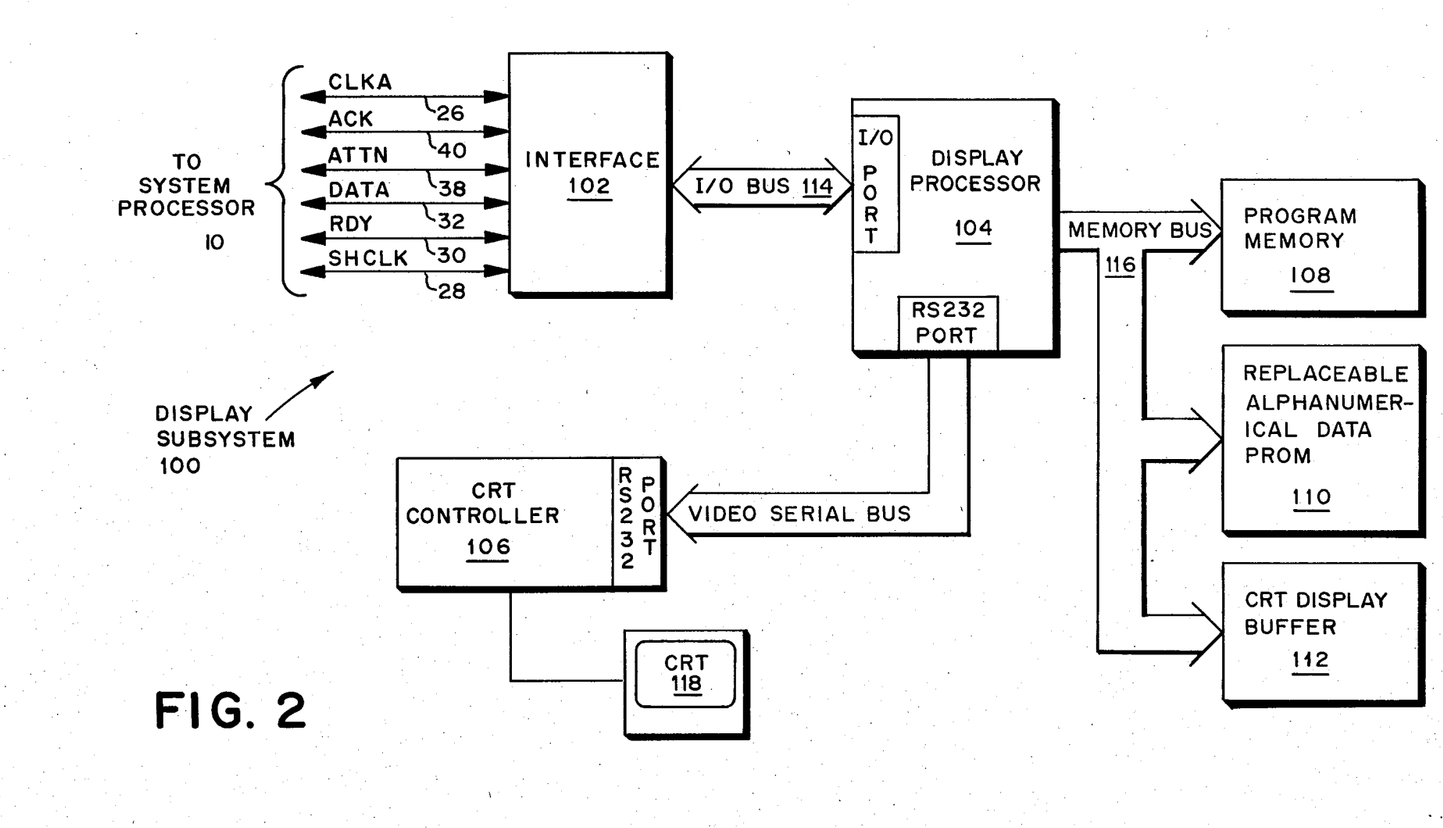
FIG. 2 is a schematic block diagram of a display subsystem in accordance with the subject invention.

Turning now to FIG. 2, there is shown a display subsystem 100 which may be substituted for peripherals subsystem processor 22 and peripheral devices 24 to form the postage metering system of the subject invention.

An interface 102 is provided as part of display subsystem 100 and connects the above-described data communications bus to I/O bus 114 to transfer data from system processor to display processor 104. This data identifies the various components of the determined postage value. In accordance with program instructions stored in program memory 100, processor 104 transfers alphanumeric data from PROM 110 into CRT display buffer 112. This alphanumeric data identifies and defines the particular values of the various components of the particular postage value determined. CRT controller 106, in response to commands from processor 104, displays the data on CRT 118. Data may be transferred from buffer 112 through a serial RS232 channel integral to processor 104 and controller 106, as shown in FIG. 2.

As will be apparent to those skilled in the art, controller 106 and CRT 118 may be any of a number of commercially available units comprising a CRT, controls, refresh buffer or buffers, character generator and appropriate power supplies and auxiliary circuitry.

It should be noted that the display of alphanumeric data on CRT's under processor control is a conventional technique well known to those skilled in the art as is the design of interfaces, such as interface 102, connecting processors to various bus structures. Thus, the detailed design of the subsystem of FIG. 2, as well as other architectures for carrying out the same functions, is considered well within the routine skill of those skilled in the art and a detailed discussion of the detailed design of this subsystem is not believed necessary to an understanding of the subject invention.

It should also be noted that while it will be obvious to those skilled in the art that memories 108, 110 and 112 could readily all consist of portions of a single memory device there are advantages to using a replaceable PROM. In particular, as names of countries change or postal service between countries changes, replacement PROMs may be provided from a central source without the need to reprogram each system in use.

Figure 3:
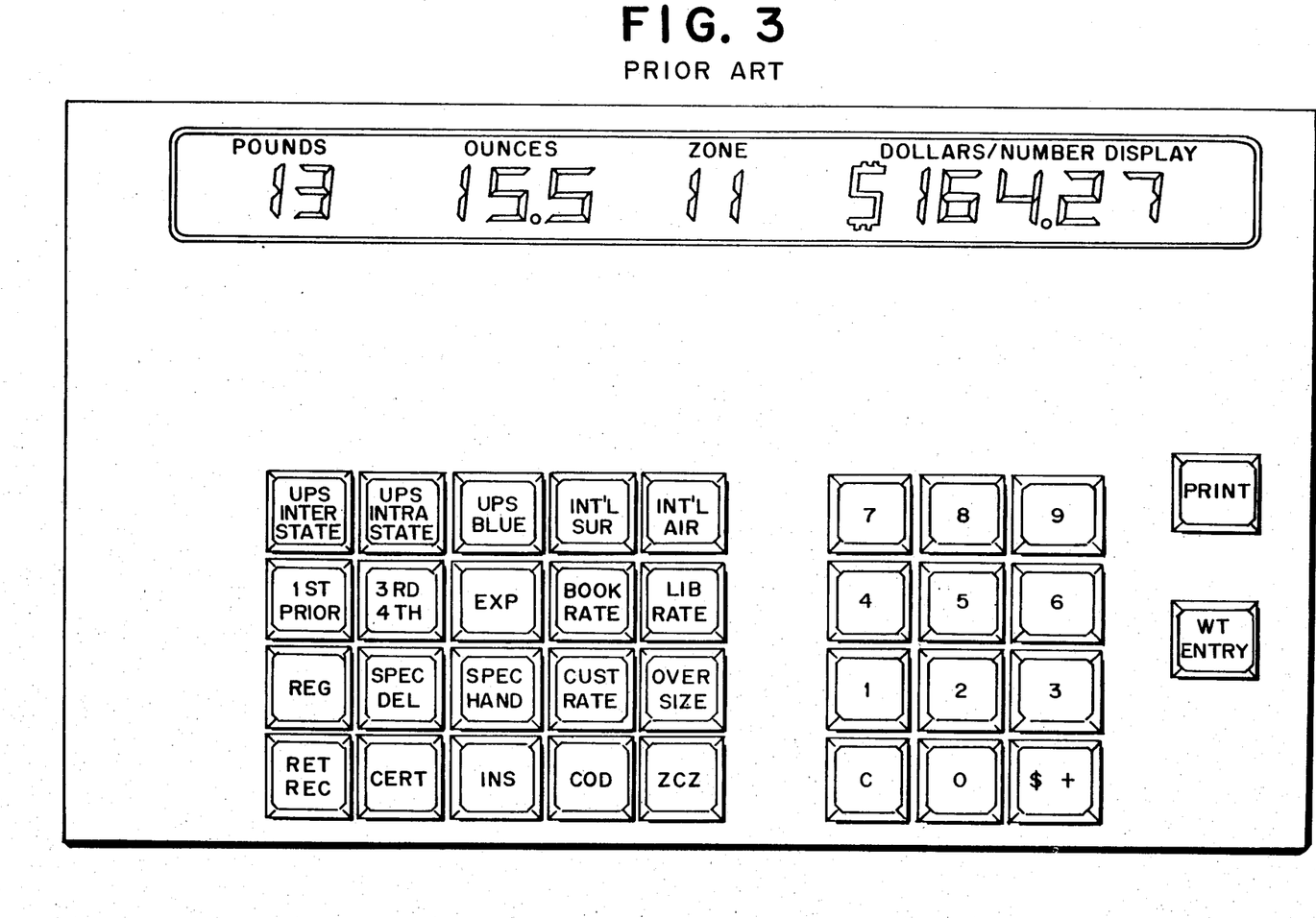
FIG. 3 is a plan view of a prior art keyboard used with postage metering systems.

Turning to FIG. 3, there is shown a conventional keyboard 12 used with prior art postage metering systems. Such keyboards include a plurality of special function keys, numeric keys and clear and print keys. To simplify operation of the postage metering system, as well as to reduce costs, functional keys are used in place of a full alphanumeric keyboard. Thus, when non-numeric information, such as the name of a destination country, is entered, it must be entered as a numeric code. Keyboard 12 also includes a limited numeric display for displaying item weight, mailing zone and a dollar value or other numeric values.

Figure 4:
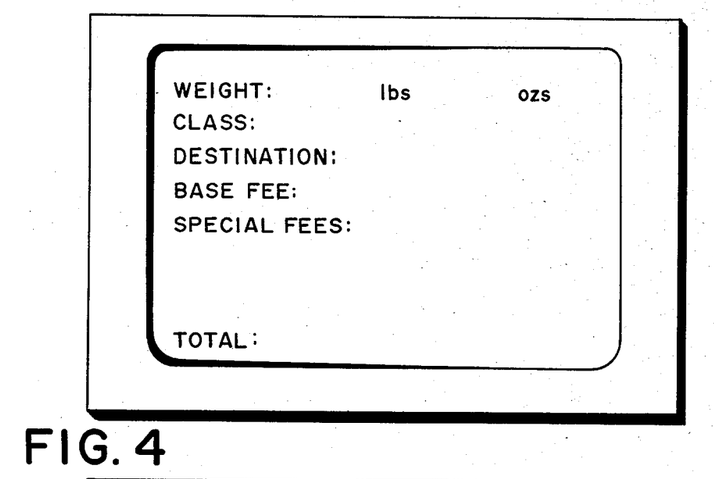
FIGS. 4–7,7a and 8–9 show the display produced by the display subsystem during the various stages of a postal transaction.
Figure 5:
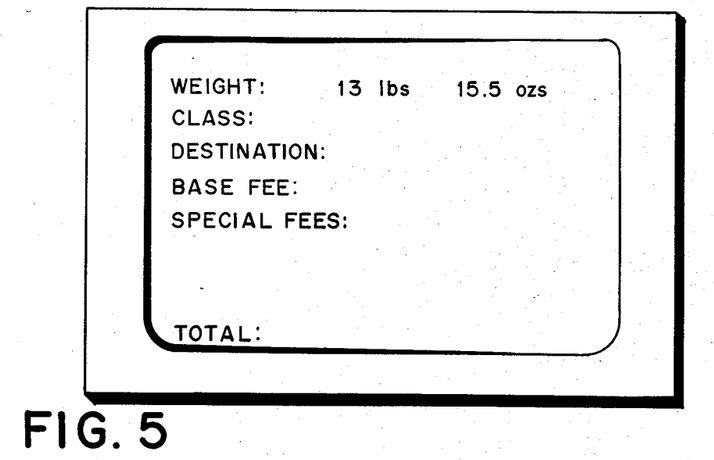
Figure 6:
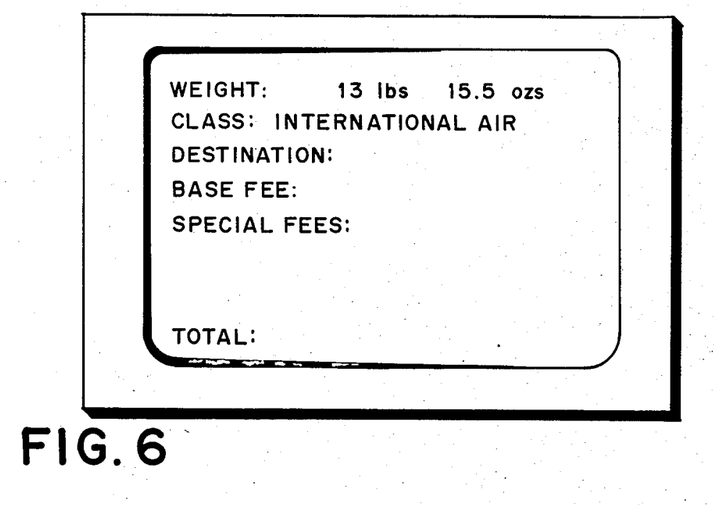
Figure 7:
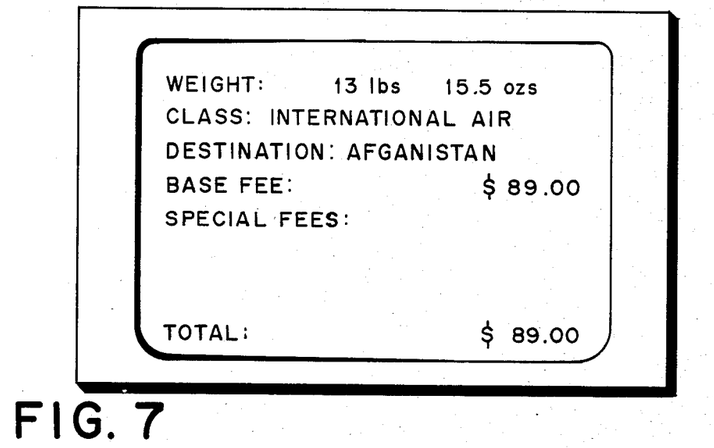

In general, the operation of prior art mailing systems using such keyboards is well known and is described in the above-incorporated U.S. patents. However, operation of the postage metering system of the subject invention will be described in conjunction with FIGS. 4–9 to illustrate the display feature of the subject invention. As an example, consider a postal service customer who wishes to mail a package airmail, certified to Afghanistan. When the customer approaches the postal window, he observes display CRT 118 showing only a blank format on the screen, as shown in FIG. 4. The customer then gives the package to the clerk/operator with appropriate mailing instructions. The clerk/operator places the package on the scale and subsystem processor 14 transfers the weight information to system processor 10 which displays it on the keyboard 12 in a known manner described in the above-incorporated U.S. patents. System processor 10 also transfers the weight to display subsystem 100 which displays it as shown in FIG. 5. The clerk/operator then depresses the International Air key and system processor identifies the class of service requested and transmits a code identifying the class to display system 100. Under control of the program stored in memory 108, display processor matches the requested class with appropriate alphanumeric data codes in PROM 110 and displays this information as shown in FIG. 6. At this point, the operator must enter the appropriate country code as a three digit number. System processor 10 now proceeds to determine the applicable base fee in accordance with a known routine as disclosed in incorporated U.S. Pat. No. 4,286,325. System processor 10 also transmits the country code, base fee and total fee to display subsystem 100 and display processor 104 matches the country code with the appropriate alphanumeric data stored in PROM 110 and displays the information as shown in FIG. 7.

Figure 7A:
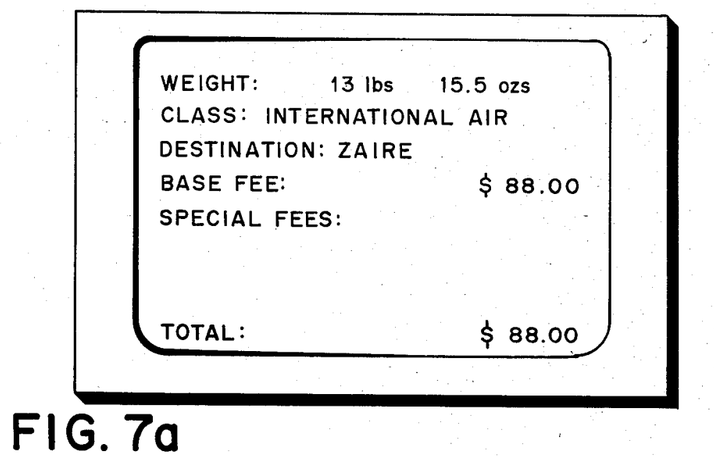

Assuming for a moment the operator erred in entering the country code, the display might appear as shown in FIG. 7a. Display of an improper destination would alert the customer and the clerk/operator to the error and the erroneous entry could be cleared and the information re-entered. Note that without such a display such an error might well pass unnoticed.

Figure 8:
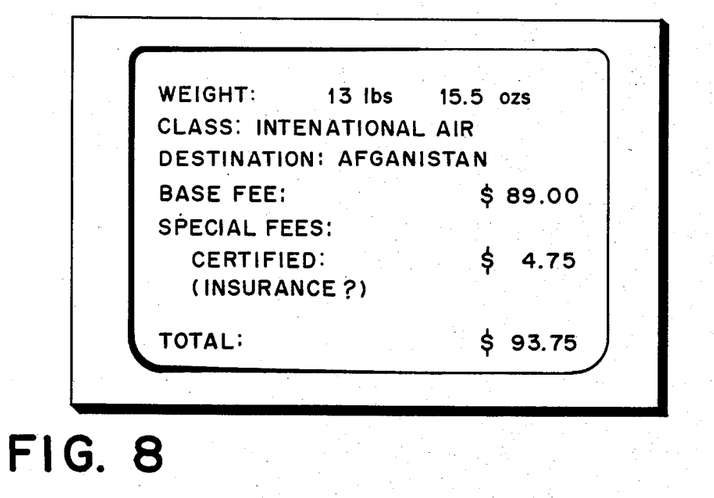

Once the correct country code is entered and the base fee determined, the clerk/operator now depresses the "Certified" key and system processor 10 determines the appropriate special fee and transmits the amount and type of special fee to display subsystem 100 and display processor 104 again selects and displays the information as shown in FIG. 8. At this point, the display may also prompt the customer. In the example shown in FIG. 8 insurance is suggested.

Figure 9:
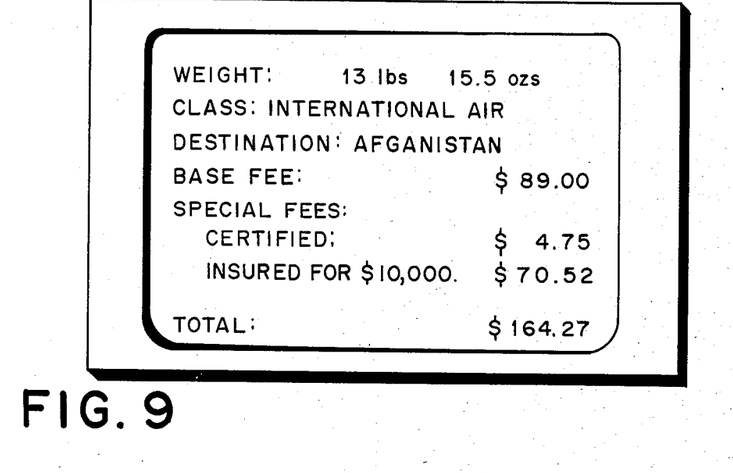

Assumming the customer wishes insurance, the clerk/operator depresses the "Insurance" key, enters the amount of insurance and the additional fee is determined, transmitted to display subsystem 100 and displayed as shown in FIG. 9. After confirming the transaction with the customer, the clerk/operator depresses the "Print" key and appropriate indicia are printed in a known manner.

Those skilled in the art will recognize that the computation of base and special fees by system processor 10 may be carried out without substantial change in the methods taught in the incorporated U.S. patents, requiring only the addition of an I/O routine for communication between system processor 10 and display subsystem 100. This is a particularly important advantage since it helps to preserve the assurance of validity processed by the extensively tested programs used in prior art postage metering systems. Applicants also wish to point out again that the display of alphanumeric characters under processor control is conventional, as is programming of display processor 104 to perform the described functions, and is believed to be well within the normal abilities of a person skilled in the art.

The above-detailed description is provided by way of illustration only and other embodiments of the subject invention will be readily apparent to those skilled in the art. Thus, in place of substituting display subsystem 100 for peripheral subsystem processor 22 and peripherals 24, display subsystem 100 may be incorporated in addition to such peripherals or if a sufficiently powerful processor is used, the functions may be combined. Similarly, if a sufficiently powerful processor is used, it is within the contemplation of the subject invention to multiplex a single display subsystem between a plurality of system processors and corresponding plurality of displays. Also, a printer or LED display may be used in place of a CRT display. Thus, limitations on the subject invention are only to be found in the claims set forth below.

What is claimed is:

1. A postage metering system comprising
    (a) postal scale means for determing postage values for items to be mailed as a function of the weight of said items and additional information entered by an operator, said postage values comprising a plurality of components;
    (b) a peripheral display subsystem connectable to said postal scale means, said subsystem further comprising:
        (b1) display means for displaying alphanumeric information;
        (b2) memory means for storing data, said data including data defining alphanumeric information describing said components of said postage values
        (b3) display processor means operatively connected to said display means and said memory means, and connectable to said postal scale means, for receiving from said postal scale means signals identifying and defining said components of said postage values, for matching said describing alphanumeric information with said components, and for controlling said display means so that said describing information is displayed in predetermined alphanumeric format.

2. A postage metering system as described in claim 1 wherein said data defining alphanumeric information further includes data defining alphanumeric information describing at least a portion of said additional information, and said display processor controls said display so that said portion of said additional information is displayed in predetermined alphanumeric format.

3. A postage metering system as described in claim 2 further comprising postage meter means for printing of indicia corresponding to said postage values and accounting for postage so expended, and wherein alphanumeric information describing said components of said postage values is displayed prior to printing of said indicia so that said postage value may be corrected before said accounting if information incorrectly defining said components has been entered into said system.

4. A postage metering system as described in claim 1 further comprising postage meter means for printing of indicia corresponding to said postage values and accounting for postage so expended, and wherein alphanumeric information describing said components or said postage values is displayed prior to printing of said indicia so that said postage value may be corrected before said accounting if information incorrectly defining said components has been entered into said system.

5. A peripheral display subsystem for use with a postal scale means for determining postage values for items to be mailed, said subsystem comprising:

(a) display means for displaying alphanumeric information;
(b) memory means for storing data, said data including data defining alphanumeric information describing components of said postage values; and
(c) display processor means operatively connected to said display means, said memory means and connectable to said postal scale means, for receiving from said postal scale means signals identifying and defining said components of said postage values, and for matching said describing alphanumeric information with said components and for controlling said display means so that said describing information is displayed in a predetermined alphanumeric format.

6. A subsystem as described in claim 5 wherein said postal scale means comprises a scale, a system processor, and a data communications bus interconnecting said scale and said system processor, said display processor means being operatively connectable to said bus.

* * * * *